United States Patent [19]
Zahzah et al.

[11] Patent Number: 6,053,050
[45] Date of Patent: Apr. 25, 2000

[54] SIGNAL CONDITIONING SYSTEM

[75] Inventors: Mohamad Zahzah, Long Beach; Gregory J. Korkosz, Malibu; Gerald Bohr, Fountain Valley, all of Calif.

[73] Assignee: McDonnell Douglas Corporation, Long Beach, Calif.

[21] Appl. No.: 08/944,947

[22] Filed: Oct. 2, 1997

Related U.S. Application Data

[60] Provisional application No. 60/027,314, Oct. 3, 1996.

[51] Int. Cl.[7] ........................................... G01B 7/16
[52] U.S. Cl. .................... 73/769; 73/771; 73/780
[58] Field of Search ............... 73/763, 765, 766, 73/769, 771, 773, 777, 780, 781, 782

[56] References Cited

U.S. PATENT DOCUMENTS

| | | | |
|---|---|---|---|
| 4,010,679 | 3/1977 | Dybel | 73/771 |
| 4,012,953 | 3/1977 | Ormond | 73/772 |
| 4,155,263 | 5/1979 | Frantz | 73/771 |
| 4,592,665 | 6/1986 | Wheable | 374/143 |
| 4,803,886 | 2/1989 | May et al. | 73/773 |
| 4,806,875 | 2/1989 | Schafer . | |
| 4,896,100 | 1/1990 | Buck | 73/780 |
| 5,048,343 | 9/1991 | Oboodi et al. . | |
| 5,061,900 | 10/1991 | Vinn et al. . | |
| 5,128,676 | 7/1992 | Ordway . | |
| 5,253,532 | 10/1993 | Kamens . | |
| 5,304,941 | 4/1994 | Tateishi . | |
| 5,423,223 | 6/1995 | Weinstock | 73/779 |

*Primary Examiner*—Max Noori
*Attorney, Agent, or Firm*—Stout, Uxa, Buyan & Mullins, LLP; Donald E. Stout

[57] ABSTRACT

A current-driven signal conditioning system comprising a first terminal, a second terminal, a strain gauge, and an instrumentation amplifier is disclosed. The strain gauge is adapted to measure a deformation of a structure and to generate a resistance which corresponds to the measured deformation. The instrumentation amplifier is adapted to be connected between the first terminal and the second terminal. The instrumentation amplifier is further adapted to be connected to the strain gauge and to place an output current on the second terminal. The output current is proportional to the resistance generated by the strain gauge. An output resister is coupled between the strain gauge and the second terminal, and a capacitor is coupled between the resister and the first terminal. A zenor diode is coupled between the first terminal and the strain gauge, and a diode is also coupled between the first terminal and the strain gauge.

24 Claims, 4 Drawing Sheets

SIGNAL CONDITIONING SYSTEM

This application claims benefit of provisional applicational Ser. No. 60/027,314 filed Oct. 3, 1996.

This invention was made under Contract No. F33657-81-C-2108 awarded by NASA. The Government has certain rights in this invention.

BACKGROUND OF THE INVENTION

1. Field of the Invention

The present invention relates generally to pressure measuring devices and, more particularly, to strain and deflection measuring devices for use in connection with aircraft.

2. Description of Related Art

Pressure transducers are used in the prior art for acquiring strain and deflection measurements from a structure of an aircraft. These prior art pressure transducers are also used for acquiring other physical measurements from the structure of the aircraft.

A conventional physical parameter measuring device will comprise a sensor, which is adapted for measuring strain, deflection, and other physical properties of the aircraft. Such a sensor is typically connected to a remote amplifier via a relatively long cable.

An example of a conventional physical parameter measuring device is a strain gauge. Strain gauges often comprise completion bridges, for example, which include a relatively large number of electronic components. This large number of electronic components requires a large amount of human labor for assembly, and may also be more susceptible to malfunction as a result of the large number of parts. Even after the initial assembly, prior art strain gauges require a substantial amount of human labor for installation, calibration, and proper operation. For example, a prior art strain gauge must be manually calibrated to ensure accurate measurements. It would be advantageous to have a physical parameter measuring device of simple design that does not require a large expenditure of materials and human labor.

In addition to requiring a relatively large amount of human labor and being relatively expensive, conventional strain gauges have small output voltage ranges that are susceptible to noise. An output voltage range of a typical strain gauge is on the order of zero plus or minus twenty millivolts. The relatively low output voltage range of zero plus or minus twenty millivolts makes the output voltage susceptible to the introduction of undesirable ambient noise, such as radar and/or power line signals, for example. Additionally, the double-ended low output voltage range of zero plus or minus twenty millivolts suffers from having a relatively limited capacity, compared to the capacity that a single-ended output voltage range would have.

SUMMARY OF THE INVENTION

The signal conditioning system of the present invention comprises an instrumentation amplifier, which is adapted for being mounted in close proximity to a sensor. Unlike prior art strain gauges, the signal conditioning system of the present invention does not comprise any completion bridges and, further, does not require a relatively large number of electronic components. Consequently, the amount of human labor required for assembly, installation, maintenance, and proper operation is reduced. A current-driven embodiment of the present invention is capable of generating a signal which has an even smaller amount of undesirable ambient noise therein.

The signal conditioning system of the present invention has a relatively large output voltage range, which is not as susceptible to noise as conventional strain gauges. The output voltage range of the signal conditioning system of the present invention is on the order of zero to five volts, instead of negative twenty millivolts to positive twenty millivolts. The single-ended output voltage range of the present invention facilitates a larger capacity, compared to the double ended low voltage range of the prior art.

According to one aspect of the present invention, a voltage-driven signal conditioning system comprises a first input terminal, a second input terminal, and an instrumentation amplifier adapted for being connected between the first input terminal and the second input terminal. The voltage-driven signal conditioning system further comprises a calibration resistor adapted for being selectively connected between the first input terminal and the second input terminal. A first resistive element is connected between the second input terminal and a ground terminal, and a connecting resistive element is connected between the first input terminal and the ground terminal. The instrumentation amplifier includes a first amplifier input terminal and a second amplifier input terminal. The first amplifier input terminal is connected to a second resistive element, and the second amplifier input terminal is connected to the second input terminal. The first amplifier input terminal is connected to the ground terminal via a third resistive element, and the second amplifier input terminal is connected to the ground terminal via the first resistive element. The instrumentation amplifier can have a gain of approximately 100. The voltage-driven signal conditioning system further comprises a line buffer having a buffer output, and an output terminal. The output terminal is adapted for being selectively connected to either the buffer output or the ground terminal. The instrumentation amplifier includes an amplifier output, and the line buffer includes a buffer input. The buffer input is adapted for being selectively connected to either the amplifier output or the first input terminal.

According to another aspect of the present invention, a current-driven signal conditioning system comprises a first terminal, a second terminal, a strain gauge, and an instrumentation amplifier. The strain gauge is adapted to measure a deformation of a structure and to generate a resistance which corresponds to the measured deformation. The instrumentation amplifier is adapted to be connected between the first terminal and the second terminal. The instrumentation amplifier is further adapted to be connected to the strain gauge and to place an output current on the second terminal. The output current is proportional to the resistance generated by the strain gauge. An output resister is coupled between the strain gauge and the second terminal, and a capacitor is coupled between the resister and the first terminal. A zenor diode is coupled between the first terminal and the strain gauge, and a diode is also coupled between the first terminal and the strain gauge.

The instrumentation amplifier of the current-driven signal conditioning system comprises a first transmitter terminal which is coupled to the first terminal and a second transmitter terminal which is coupled to the output resistor. A capacitor is coupled between the first strain terminal and the second transmitter terminal, and a capacitor is coupled between the second strain terminal and the second transmitter terminal. The first transmitter terminal comprises a first current source, and the second transmitter terminal comprises a second current source. The strain gauge comprises a first strain terminal and a second strain terminal. The first strain terminal is coupled to the first current terminal of the instrumentation amplifier, and the second strain terminal is coupled to the second current terminal of the instrumentation amplifier. A shunt resister is adapted to be selectively connected to and disconnected from both the first strain terminal and the second strain terminal. The instrumentation amplifier preferably comprises an XTR 103 instrumentation amplifier.

The present invention, together with additional features and advantages thereof, may best be understood by reference to the following description taken in connection with the accompanying illustrative drawings.

DESCRIPTION OF THE PREFERRED EMBODIMENTS

Figure 1:
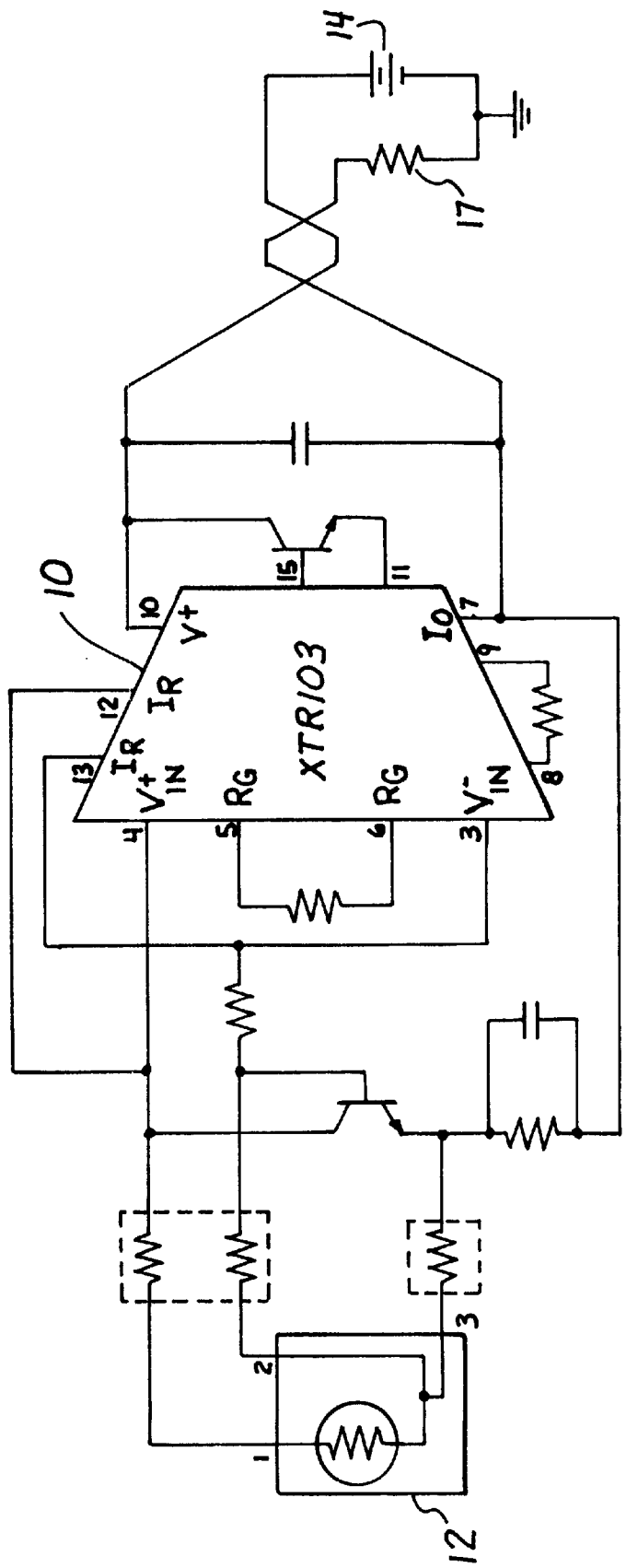
FIG. 1 illustrates an XTR 103 instrumentation amplifier connected to a resistive temperature device, according to the prior art.

Referring more particularly to the drawings, FIG. 1 illustrates an instrumentation amplifier 10 which is connected to a Resistive Temperature Device (RTD) 12. A loop power supply 14 provides power to the instrumentation amplifier 10, and an output loop current from the instrumentation amplifier 10 is measured across the series load resistor 17. Details of the circuit configuration of FIG. 1 are disclosed in Burr-Brown IC Data Book-Linear Products, Chapter 4, published by Burr-Brown.

Figure 2:
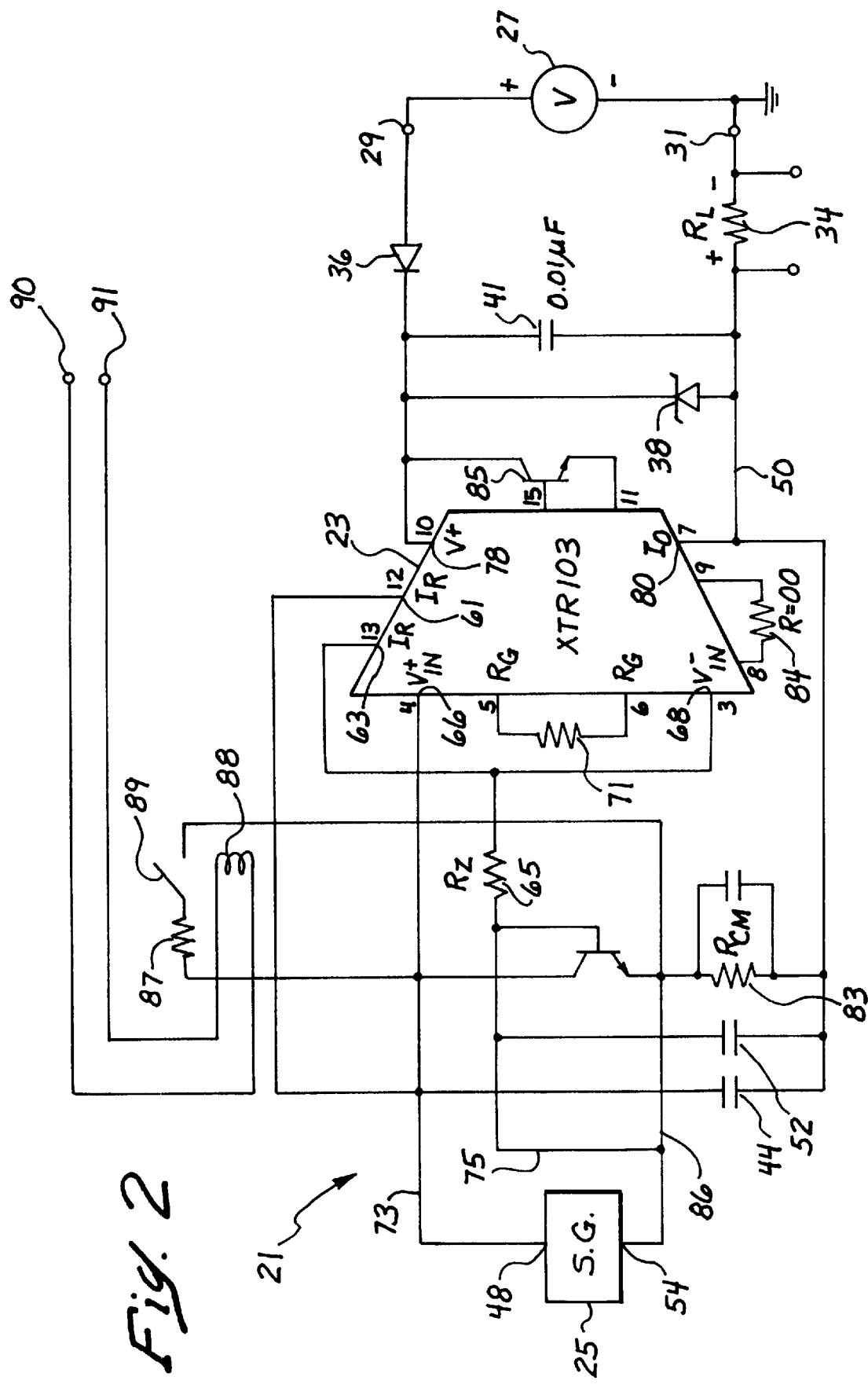
FIG. 2 illustrates an XTR 103 instrumentation amplifier connected to a strain gauge in accordance with the present invention.

Turning to FIG. 2, the signal-conditioning system 21 of the presently preferred embodiment is illustrated comprising an instrumentation amplifier 23 connected to a strain gauge 25. The strain gauge 25 may comprise any conventional means for generating a resistance in response to a deformation of a metal structure or other composite structure. External loads can be placed upon the structure, and the resistances generated by the strain gauge 25 can be measured.

Strain gauges play an integral part in structural strength tests. A typical strain gauge installation can require approximately four hours of human labor. This installation includes the initial connection of the strain gauge to the structure to be tested, and includes the connection of the strain gauge to instrumentation which can acquire and archive the resistances produced by the strain gauge during the test. The strain gauge 25 of the presently preferred embodiment changes resistance proportionally to the measured strain, with each unit of microstrain being equivalent to 0.7 mΩ of resistance. This relatively small magnitude of resistance can be effectively measured by incorporation of the instrumentation amplifier 23, which preferably comprises an XTR 103 instrumentation amplifier, manufactured by Burr-Brown. Any other circuit having comparable functions in the arena described in the embodiment of FIG. 2, for example, can be used in place of the instrumentation amplifier 23.

A loop power supply 27 is applied between a first terminal 29 and a second terminal 31. A series load resistor 34 is connected between the second terminal 31 and the instrumentation amplifier 23. Additionally, in accordance with the presently preferred embodiment, a diode 36 is placed between the first terminal 29 and the instrumentation amplifier 23, and a zenor diode 38 is placed between the series load resistor 35 and the diode 36. A capacitor 41 is coupled between the series load resistor 34 and the diode 36. The diode 36 and the capacitor 41 protect against reversed output connection lines. The diode 36 offers series protection, and the zenor diode 38 can operate to clamp the voltage applied to the instrumentation amplifier 23 to a safe level. The loop power supply 27 is preferably lower than the voltage rating of the zenor diode 38. Zenor diode types specifically designed to provide a very low impedance clamp and to withstand large energy surges are preferred. These zenor diodes preferably have diode characteristics in the forward direction which also protect against reversed loop connections. Reversed loop connection can result in a large loop current, which can possibly damage the series load resistor 34.

A first bypass capacitor 44 is connected between a first strain terminal 48 and an output loop current line 50, and a second bypass capacitor 52 is connected between a second strain terminal 54 and the output loop current line 50. The value of the first bypass capacitor 44 preferably comprises 0.01 $\mu$ Farad, and the value of the second bypass capacitor 52 preferably comprises a value of 0.01 $\mu$ Farad. In the presently preferred embodiment, the strain gauge 25 is placed approximately one foot from the instrumentation amplifier 23. The lines connecting the strain gauge 25 to the instrumentation amplifier 23 can be subject to Radio Frequency (RF) interference. Radio Frequency interference, if not eliminated, can be rectified by the sensitive input circuitry of the instrumentation amplifier 23, resulting in errors. The first bypass capacitor 44 and the second bypass capacitor 52 are preferably placed in close proximity to the instrumentation amplifier 23 in order to reduce or eliminate Radio Frequency interference.

The first transmitter terminal 61 and the second transmitter terminal 63 comprise a first current source and a second current source, respectively. The two current sources are preferably matched at 0.8 mA each. The two current sources from the first transmitter terminal 61 and the second transmitter terminal 63 drive the strain gauge 25 and the zero-setting resistor 65. In the presently preferred embodiment, the strain gauge 25 comprises a resistance of approximately 350 Ω. The zero-setting resistor 65 is preferably chosen to have a resistance equal to the resistance of the strain gauge 25 at a low-scale (minimum) measurement strain. The zero-setting resistor 65 can be adjusted to achieve 4 mA output, for example, at the minimum measurement strain to correct for input offset voltage and reference current mismatch of the instrumentation amplifier 23. In the presently preferred embodiment the zero-setting resistor 65 comprises a resistance of 336 Ω. The value of the zero-setting resistor 65 can be adjusted to minimize initial errors. For example, a strain gauge 25 having a different resistance, or lines 73, 75 having different line resistances, or a different instrumentation amplifier 23, would likely require a different value for the zero-setting resistor 65. The instrumentation amplifier 23 routes current from the first transmitter terminal 61 through the strain gauge 25, and routes current from the second transmitter terminal 63 through the zero-setting resistor 65. The voltage difference between the strain gauge 25 and the zero-setting resistor 65 is measured by the instrumentation amplifier 23.

In an alternative embodiment, the first strain terminal 48 can be routed directly and only to the first transmittal terminal 61 and to the V⁺ terminal 66, and the second strain terminal 54 can be routed directly and only to the zero-setting resistor 65. The zero-setting resistor 65 is connected to the second transmitter terminal 63 and the V⁻ terminal 68, similarly to the presently preferred embodiment of FIG. 2. The two-wire connection to the strain gauge 25 of this alternative embodiment can introduce line resistance error. This line resistance error can be partially corrected by adjusting the values of the zero-setting resistor 65, the resistor 71, and the line resistances of the two lines 73, 75.

The three-wire connection to the strain gauge 25 of the presently preferred embodiment, illustrated in FIG. 2, can provide improved accuracy with remotely located strain gauges 25. The current from the zero-setting resistor 65 is routed through a third wire to the strain gauge 25. Assuming the line resistances of the wires 73, 75 are equal, this configuration produces a small common-mode voltage which is rejected by the instrumentation amplifier 23.

The instrumentation amplifier 23 comprises a monolithic 4–20 mA, two-wire current transmitter configuration. The instrumentation amplifier 23 preferably provides current excitation, instrumentation amplifier, linearization, and current output circuitry on a single integrated circuit, for reduced cost. Versatile linearization circuitry provides a second-order correction to the strain gauge 25, typically achieving a 40:1 improvement in linearity. The instrumentation amplifier gain can be configured for a wide range of strain measurements. Total adjusted error of the complete current transmitter including the linearized strain gauge measurement is preferably less than plus or minus one percent. This total adjusted error includes zero drift, span drift, and non-linearity. The instrumentation amplifier 23 is preferably configured to operate on voltages, applied to the V⁺ terminal 78, ranging from 9 Volts to 40 Volts. This voltage is measured with respect to the $I_o$ terminal 80. The loop power supply voltage 27 will differ from the voltage supplied to the terminal 78 according to the voltage drop on the series load resistor 34, including any other voltage drop in the line. If a low-loop power supply 27 voltage is used, the series load resistor 34 must be chosen to have a relatively low value in order to ensure that the voltage on terminal 78 remains 9 Volts or greater for a maximum loop current of 20 mA.

The resistor 83 provides an additional voltage drop to bias the inputs of the instrumentation amplifier 23 within their common-mode range. The value of the resistor 83 is preferably 800 Ω. The resistor 71 sets the gain of the instrumentation amplifier 23 according to the desired strain measurement range. The transfer function through the complete instrumentation amplifier 23 and voltage-to-current converter is provided below.

$$I_o = V_{IN} * (0.016 + 40/R_G) + 4 \text{ mA} \qquad \text{Equation 1}$$

The variable $V_{IN}$ is measured in Volts, the variable $R_G$ is measured in Ω, and the resistance 84 is chosen to be infinity. The variable $V_{IN}$ is the differential input voltage. A 0 V to 1 V input produces a 4–20 mA output current. In the presently preferred embodiment, the resistor $R_g$ shown at reference numeral 71 in FIG. 2 comprises a resistance of 60 Ω.

The optional transistor 85 provides predictable behavior with open-circuit strain gauge connections. The transistor 85 ensures that the output current of the instrumentation amplifier 23 will go to either the high current limit or the low current limit, when any of the three strain gauge connections 73, 75, 86 are broken. The high current limit or the low current limit would be detected as an out of range condition.

In the presently preferred embodiment, the instrumentation amplifier 23 comprises on-chip linearization circuitry for creating a signal-dependent variation in the two matching current sources at the first transmitter terminal 61 and the second transmitter terminal 63. Both current sources are varied equally according to the following equation.

$$I_{R1} = I_{R2} = 0.8 + (500 * V_{IN})/R_{LIN} \qquad \text{Equation 2}$$

The variable $R_{LIN}$ represents a resistance of the lines 73, 75 measured in Ω, the variables $I_{R1}$ and $I_{R2}$ are measured in mA, the variable $V_{IN}$ is measured in Volts, and the equation contemplates a maximum $I_R$ of 1 mA. The varying excitation set forth above provides a second-order term to the transfer function (including the strain gauge) which can correct any non-linearity of the strain gauge 25. The correction can be controlled, for example, by the resistances of the lines 73, 75 which are chosen according to the desired strain measurement range. In the presently preferred embodiment, no linearity is desired and, accordingly, the resistor 84 is chosen to be infinity. An infinite resistance 84 causes the excitation current to remain at a constant 0.8 mA.

The transistor 85 conducts the majority of the signal-dependent 4–20 mA loop current. The use of this external transistor 85 isolates the majority of the power dissipation from the precision input and reference circuitry of the implementation amplifier 23, thus maintaining accuracy. Since the external transistor 85 is preferably disposed in a feedback loop, the characteristics of the external transistor 85 are not critical. The presently preferred parameters for the external transistor 85 are provided in the above-mentioned Burr-Brown IC Data Book-Linear Products. This publication provides further details relating to the circuits of FIGS. 1 and 2, and the entire contents of the publication are expressly incorporated herein by reference.

In accordance with the presently preferred embodiment, a shunt resistor 87 is coupled to both the first strain terminal 48 and the second strain terminal 54. A coil 88 drives a switch 89 to selectively apply the shunt resistor 87 between the first strain terminal 48 and the second strain terminal 54. Two terminals 90, 91 provide current to the coil 88. The shunt resistor 87 preferably comprises 50 KΩ, and is adapted for calibrating the output of the strain gauge 25.

The signal conditioning system 21 of FIG. 2 is current-driven. This current-driven configuration provides increased resistance to the introduction of undesirable ambient noise into the output. At any given time, for example, the instantaneous voltage drop across the series load resistor 34 will effectively cancel out the noise. The signal conditioning system 21 can be manufactured at a very economical rate, and can be installed and tested with a nominal amount of human labor.

Figure 3:
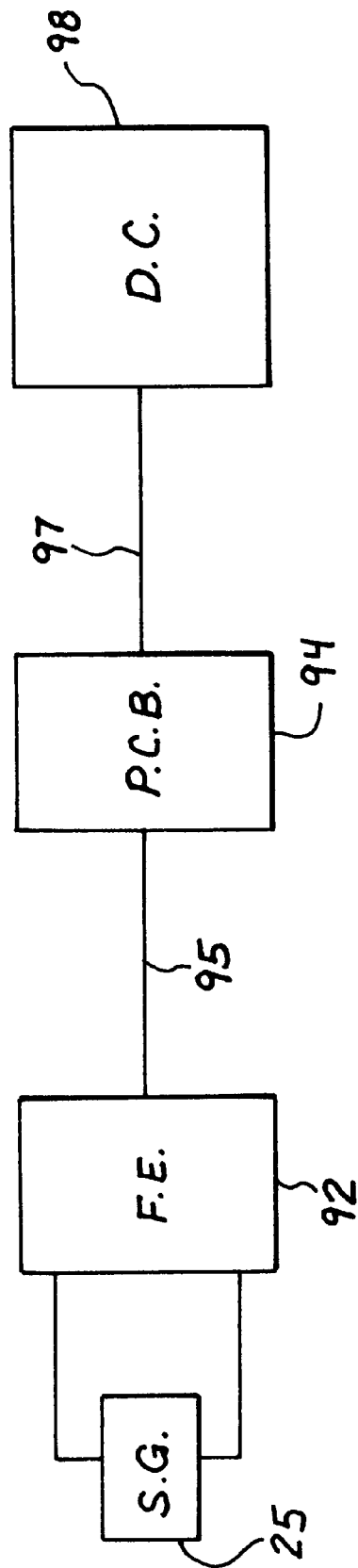
FIG. 3 is a block diagram illustrating a strain gauge connected to field electronics including an XTR 103 instrumentation amplifier, and also connected to a data acquisition computer.

FIG. 3 illustrates a schematic block diagram of a strain gauge 25 connected to field electronics 92. The field electronics 92 comprise a majority of the circuitry of FIG. 2, as presently embodied. The field electronics 92 allow a technician to confirm proper operation of the strain gauge 25, by selectively connecting a shunt resistor between the first strain terminal 48 and the second strain terminal 54 and, subsequently, measuring an output across a series load resistor supplied by the field technician. The series load resistor supplied by the field technician is preferably housed within a diagnostic box carried by the field technician. The actual series load resistor 34 is preferably disposed within the printed circuit board 94.

A twisted ribbon cable 95 connects the field electronics 92 to the printed circuit board 94 in accordance with the present invention. Other conductive paths may be used in alternative embodiments. The twisted ribbon cable 95 is preferably manufactured of a low-cost line, such as a telephone line. The twisted ribbon cable 95 preferably comprises a flat spot at every 20-foot interval. The printed circuit board 94 further comprises a controller for selectively engaging and disengaging the shunt resistor 87.

A SCSI cable 97 is preferably used to connect the printed circuit board 94 to a data acquisition computer 98. Other conductive paths may be used in alternative embodiments. In accordance with the present invention, the field electronics 92 condition and amplify the signal of the strain gauge 25.

The field electronics 92 are preferably manufactured at a very low cost, so that the field electronics 92 can be disposed of as an option to being repaired. The field electronics 92 preferably comprise tight tolerances and diagnostic capabilities, so that the field electronics 92 circuits are consistent in producing identical magnitudes relative to one another. Although a telephone line 95 is presently preferred for connecting the field electronics 92 to the printed circuit board 94, other shielded lines in alternative embodiments comprising two twisted pairs of conductors may be used. One pair of conductors carries power to the terminal 78 of the instrumentation amplifier 23 and receives the output signal on the output loop current line 50. The second pair of conductors controls the diagnostic capabilities of the electronic circuit. For example, the second pair of conductors may be used to operate the coil 88. The printed circuit board 94 preferably comprises a Hewlett-Packard VSI algorithmic control card connection, which comprises a SCSI connector interface that supports 16 channels per cable (4 connectors per 64 channel card). The interface card is preferably adapted to convert the 4–20 mA signal from the instrumentation amplifier 23 to a 0.8–4 Volt signal, measured across the series load resistor 34. The series load resistor 34 preferably comprises 200 Ω in order to provide this voltage output. The data acquisition computer 98 preferably comprises a R1415A system, and is adapted for processing information received from the printed circuit board 94. The data acquisition computer 98 can automatically perform diagnostic functions, and can automatically process and store collected data.

Figure 4:
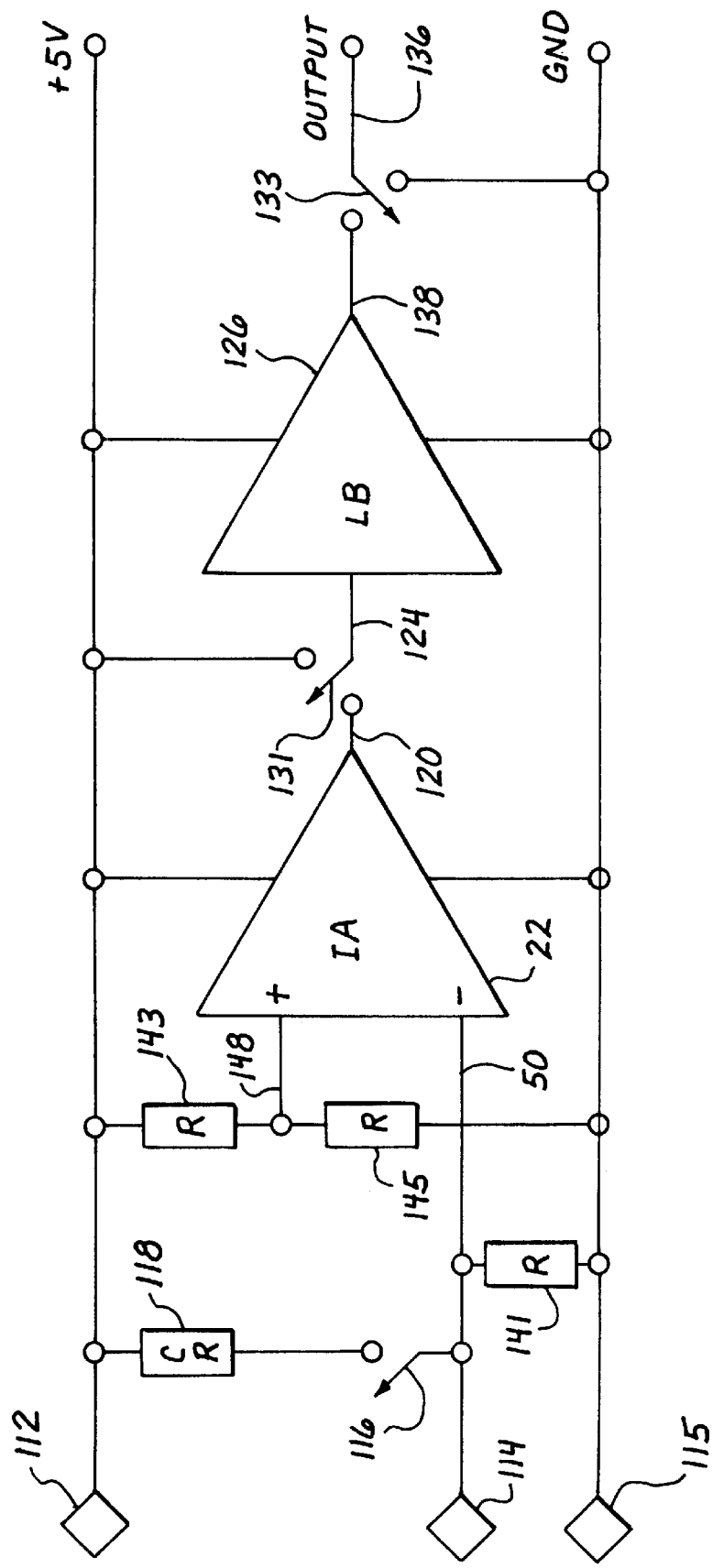
FIG. 4 is a schematic illustration of a signal-conditioning system in accordance with an alternative embodiment of the present invention.

Referring now to FIG. 4, a voltage-driven signal conditioning system 110 according to an alternative embodiment of the present invention is illustrated, having a first input terminal 112, a second input terminal 114, and a ground terminal 115. The signal conditioning system 110 is adapted for being connected to a strain gauge (not shown), between the first input terminal 112 and the second input terminal 114. The signal conditioning system 110 is preferably computer controlled, for performing automated functions such as providing a zero reading, providing output with a calibration resistor for a calibration process, disconnecting the calibration resistor, and providing a high-level output signal proportional to the change in measured strain. When the signal conditioning system 110 is first powered on, a voltage of approximately 5 Volts is applied to the first input terminal 112, as presently embodied. This initial application of voltage to the first input terminal 112 initiates a computer-controlled calibration sequence. In this calibration sequence, the first switch 116 is connected between a calibration resistor 118 and the second input terminal 114. A similar procedure is preferably implemented with the presently preferred embodiment of FIGS. 2 and 3. Additionally, an amplifier output 120 of an instrumentation amplifier 122 is connected to the buffer input 124 of the line buffer 126 via the second switch 131. The third switch 133 connects the output terminal 136 to the buffer output 138 of the line buffer 126.

According to the computer controlled calibration sequence of the present invention, as applied to the embodiment of FIG. 4, for example, a zero signal is applied to the second input terminal 114, and a potential of the output terminal 136 is measured. The potential at the output terminal 136 should be zero plus or minus 4 to 5 mV. If the magnitude of the potential at the output terminal 136 is greater than 5 mV, for example, the computer controlled process will adjust the calibration resistor 118 until the potential at the output terminal 136 falls below 5 mV, for example. A first resistive element 141 is connected between the second input terminal 114 and the ground terminal 115. The first input terminal 112 is connected to the ground terminal 115 via a second resistive element 143 and a third resistive element 145. The first amplifier input terminal 148 is connected between the second resistive element 143 and the third resistive element 145, and the second amplifier input terminal 150 is connected to the second input terminal 114.

After this calibration sequence is performed, the first switch 116 is moved to disconnect the calibration resistor 118 from the second input terminal 114, and a sensor, such as a strain gauge, for example, is connected to the second input terminal 114.

The signal from the sensor is amplified by the instrumentation amplifier 122 to a high-level output signal, which is preferably on the order of zero to five volts. This output signal at the output terminal 136 is proportional to the change in strain measured by the sensor. The high-level output signal will eliminate noise problems associated with conventional low-level output signals, and additionally the single-ended output signal will double the capacity of the measurement, compared to conventional double-ended output signals.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

We claim:

1. A signal conditioning system, comprising:
   a first terminal;
   a second terminal;
   a resistive strain gauge adapted to measure a deformation of a structure and to generate a resistance which corresponds to the measured deformation; and
   an instrumentation amplifier comprising at least one current source coupled to the strain gauge to facilitate measurement of the resistance generated by the strain gauge, and further comprising at least one other current source coupled to the second terminal to facilitate placement of an output current on the second terminal which is proportional to the measured resistance generated by the strain gauge.

2. The signal conditioning system as recited in claim 1, the signal conditioning system further comprising an output resistor coupled between the strain gauge and the second terminal.

3. The signal conditioning system as recited in claim 2, the signal conditioning system further comprising a capacitor coupled between the resistor and the first terminal.

4. The signal conditioning system as recited in claim 3, the signal conditioning system further comprising a zenor diode coupled between the first terminal and the strain gauge.

5. The signal conditioning system as recited in claim 2, the signal conditioning system further comprising a diode coupled between the first terminal and the strain gauge.

6. The signal conditioning system as recited in claim 1, the instrumentation amplifier comprising:
  a first transmitter terminal which is coupled to the first terminal; and
  a second transmitter terminal which is coupled to the output resistor.

7. The signal conditioning system as recited in claim 6, the signal conditioning system further comprising a capacitor coupled between the first strain terminal and the second transmitter terminal.

8. The signal conditioning system as recited in claim 6, the signal conditioning system further comprising a capacitor coupled between the second strain terminal and the second transmitter terminal.

9. The signal conditioning system as recited in claim 1, wherein the at least one current source comprises:
  a first current source coupled to the strain gauge; and
  a second current source coupled to the strain gauge.

10. The signal conditioning system as recited in claim 9, wherein the strain gauge comprises a first strain terminal and a second strain terminal, the first strain terminal being coupled to the first current terminal of the instrumentation amplifier and the second strain terminal being coupled to the second current terminal of the instrumentation amplifier.

11. The signal conditioning system as recited in claim 10, the signal conditioning system further comprising a shunt resistor adapted to be selectively connected to and disconnected from both the first strain terminal and the second strain terminal.

12. The signal conditioning system as recited in claim 11, wherein the instrumentation amplifier comprises an XTR 103 instrumentation amplifier.

13. The signal conditioning system as set forth in claim 11, and further comprising a switch adapted to automatically connect and disconnect the shunt resistor between the first input Terminal and the second output terminal.

14. A signal conditioning system, comprising:
  a first input terminal;
  a second input terminal;
  an instrumentation amplifier connected to a strain gauge to measure a resistance thereof, and further connected between the first input terminal and the second input terminal to place an output current on one of the first input terminal and the second input terminal that is proportional to the measured resistance;
  a resistor adapted to be connected between the second input terminal and the instrumentation amplifier;
  a calibration resistor adapted to be selectively connected between the first input terminal and the second output terminal; and
  a switch adapted to selectively connect the calibration resistor between the first input terminal and the second output terminal.

15. A signal conditioning system, comprising:
  a first input terminal;
  a second input terminal;
  an instrumentation amplifier connected to output a first current to facilitate measurement of a resistance of a strain gauge and to output a second current on one of the first input terminal and the second input terminal that is proportional to the measured resistance; and
  a calibration resistor adapted for being automatically connected and disconnected between the fist input terminal and the second output terminal.

16. The signal conditioning system as recited in claim 15, further comprising:
  a ground terminal; and
  a first resistive element connecting the second input terminal to the ground terminal.

17. The signal conditioning system as recited in claim 16, further comprising a connecting resistive element connecting the first input terminal to the ground terminal.

18. The signal conditioning system as recited in claim 17, the connecting resistive element comprising a second resistive element and a third resistive element, and the instrumentation amplifier having a first amplifier input terminal and a second amplifier input terminal, the first amplifier input terminal being connected to the second resistive element and the second amplifier input terminal being connected to the second input terminal.

19. The signal conditioning system as recited in claim 18, the first amplifier input terminal being connected to the ground terminal via the third resistive element; and
  the second amplifier input terminal being connected to the ground terminal via the first resistive element.

20. The signal conditioning system as recited in claim 19, the instrumentation amplifier having a gain of 100.

21. The signal conditioning system as recited in claim 20 further comprising:
  a line buffer having a buffer output; and
  an output terminal that is adapted for being selectively connected to one of the buffer output and the ground terminal.

22. The signal conditioning system as recited in claim 19, the instrumentation amplifier includes an amplifier output; and
  the line buffer includes a buffer input adapted for being selectively connected to one of the first input terminal and the amplifier output.

23. The signal conditioning system as set forth in claim 14, wherein the instrumentation amplifier comprises two current sources which are adapted to be connected to two corresponding terminals of a resistive strain gauge.

24. The signal conditioning system as set forth in claim 15, and further comprising a switch adapted to automatically connect and disconnect the calibration resistor between the first input terminal and the second output terminal.

* * * * *